United States Patent [19]

Pflug

[11] Patent Number: 5,671,929
[45] Date of Patent: Sep. 30, 1997

[54] LENTICULAR SEALING RING WITH ALTERNATING GRAPHITE AND METAL LAMELLAE

[75] Inventor: Herwig Pflug, Waldems, Germany

[73] Assignee: Klinger AG, Zug, Sweden

[21] Appl. No.: 683,849

[22] Filed: Jul. 19, 1996

[30] Foreign Application Priority Data

Jul. 20, 1995 [DE] Germany ............. 195 26 364.2

[51] Int. Cl.⁶ ............................................. F16J 15/12
[52] U.S. Cl. ............................... 277/233; 277/235 R
[58] Field of Search ........................... 277/233, 235 R, 277/227, 229, 188 R; 285/910

[56] References Cited

U.S. PATENT DOCUMENTS

| 2,191,044 | 2/1940 | Seligman | 277/235 R |
|---|---|---|---|
| 2,537,230 | 1/1951 | Mueller. | |
| 4,423,544 | 1/1984 | Kashmerick et al.. | |
| 4,601,475 | 7/1986 | Nicholson | 277/235 R |
| 4,892,320 | 1/1990 | Tuchmantel | 277/235 R |
| 5,040,805 | 8/1991 | Ozora. | |
| 5,544,898 | 8/1996 | Nendzig et al. | 277/233 |

FOREIGN PATENT DOCUMENTS

| 0 248 944 | 12/1987 | European Pat. Off.. | |
|---|---|---|---|
| 799313 | 6/1936 | France | 277/235 R |
| 1222665 | 6/1960 | France | 277/233 |
| 41 37 475 | 5/1993 | Germany. | |
| 4306369 | 9/1994 | Germany | 277/233 |
| 6-101763 | 4/1994 | Japan | 277/233 |
| 320652 | 12/1972 | U.S.S.R. | 277/233 |
| 2182985 | 5/1987 | United Kingdom | 277/233 |

*Primary Examiner*—Scott Cummings
*Attorney, Agent, or Firm*—Chilton, Alix & Van Kirk

[57] ABSTRACT

A lenticular sealing ring comprises alternately arranged lamellae (1) made of expanded graphite and metal lamellae (2). The density of the graphite lamellae (1) increases from the inside toward the outside of the sealing ring. The layering is configured so that on both sides of the lenticular surfaces at least half of the curved surface is covered by a continuous graphite lamella (1') and a plurality of encircling metal and graphite lamellae (1, 2) terminated in the outer edge region.

15 Claims, 2 Drawing Sheets

LENTICULAR SEALING RING WITH ALTERNATING GRAPHITE AND METAL LAMELLAE

BACKGROUND OF THE INVENTION

This invention relates generally to sealing rings which comprise alternately arranged graphite and metal lamellae.

Rigid and movable components are commonly sealed in clamping connections, threaded connections or the like by means of O-ring seals or profile ring seals. Such ring seals are preferably made of an elastomeric material. However, for static loading conditions, sealing rings of this type tend to display after a relatively short period of time a considerably reduced restoring force in the region of contact which becomes set under compressive force. At higher temperatures and/or with additional action of certain media in various physical states (for example, water vapor), such elastomeric sealing rings quickly reach the limit of their useful lifetime.

European Patent 0 248 944 discloses sealing rings which are used, for example, as stuffing box gaskets or in shut-off members for sealing purposes in the region where the medium passes through the sealing ring. The sealing rings have a cylindrical layering of graphite lamellae and metal lamellae. Such sealing rings are not suitable for replacing O-ring seals.

SUMMARY OF THE INVENTION

An object of the present invention is to provide a new and improved sealing ring having alternately arranged graphite lamellae and metal lamellae which can be used instead of conventional elastomeric O-ring seals to provide an extended useful lifetime.

This object is achieved by providing a sealing ring which has a lenticular shape with a central inner axial opening, an outer peripheral edge region and a pair of axially opposed curved surfaces. The graphite lamellae and the metal lamellae are arranged in alternating relationship. The density of the graphite lamellae increases from the inner portion to the outer portion of the sealing ring. Graphite lamellae cover the axially opposed curved portions and extend from the inner opening toward the outer edge of the sealing ring. The exposed outer surfaces of the sealing ring are comprised of encircling metal and graphite lamellae which terminate at the outer edge region.

Such a sealing ring can be used in the range of from −200° to +500° C. at pressures ranging from a vacuum up to approximately 200 bar. The sealing ring also has a high degree of chemical resistance and can be used for sealing purposes in the regions of threaded or clamping connections or as adjustable packing for sealing stationary movable components or the like.

In applications in which the lenticular sealing ring is clamped between conical sealing surfaces, the layered structure of the sealing ring, wherein the density of the graphite lamellae increases from the inside of the sealing ring towards the outside, results in a pressure building up in the sealing ring in the region of lower density, i.e., from the inside, and results in an increased bearing force in the region of the curved surfaces and thus increases the sealing action of the sealing ring. A plurality of narrow, encircling sealing surfaces which are separated from one another are disposed on the outer circumference of the sealing ring. The sealing surfaces are thus secured against flushing out to thereby result in a type of helical sealing action.

BRIEF DESCRIPTION OF THE DRAWINGS

The invention is explained in more detail herein below with reference to an exemplary embodiment represented in the accompanying figures in which.

DETAILED DESCRIPTION OF THE PREFERRED EMBODIMENT

Figure 2:
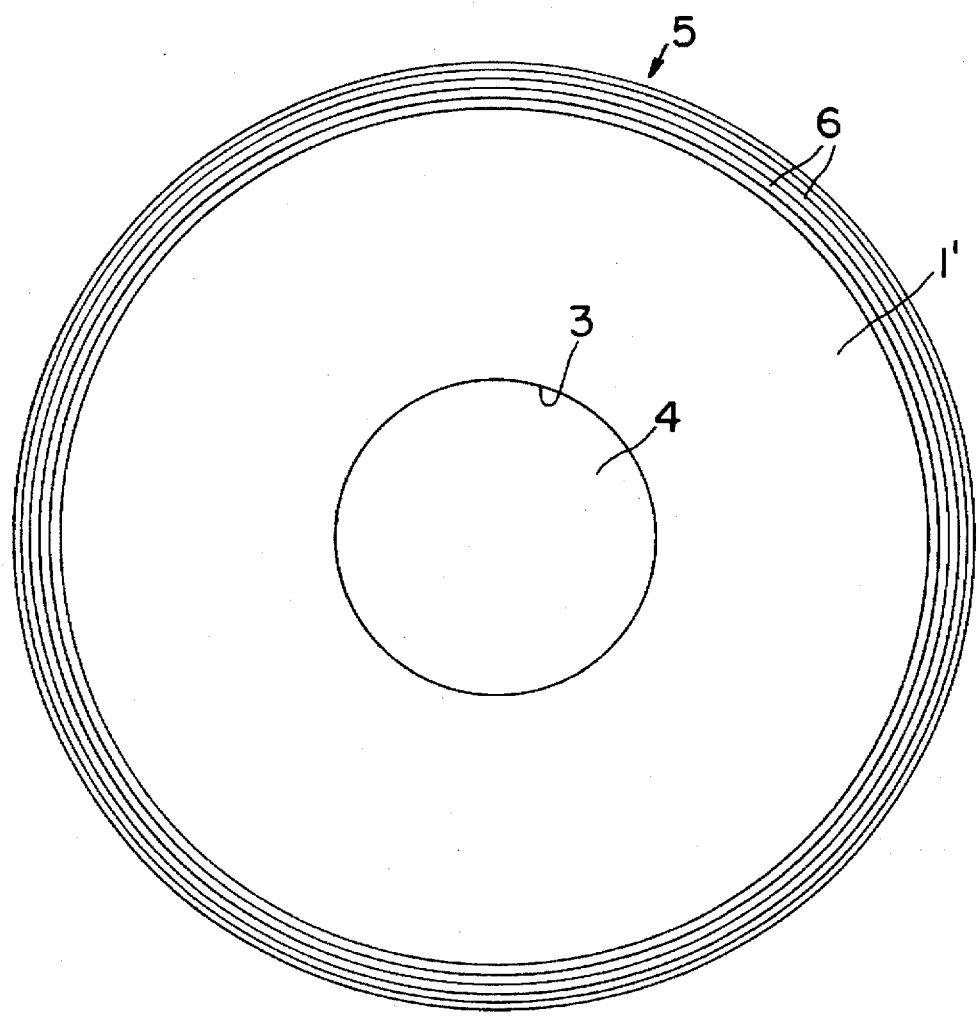
FIG. 2 is a top plan view of the sealing ring of FIG. 1.

With reference to the drawings wherein like numerals represent like parts throughout the figures, a sealing ring illustrated in FIG. 2 comprises alternately arranged annular graphite lamellae 1 made of expanded flexible graphite and annular metal lamellae 2 made, for example, of stainless steel foil. The sealing ring has a lenticular shape with an axial opening which defines a through passage of cylindrical shape in the illustrated exemplary embodiment. The opening is defined by an inner edge 3.

A continuous graphite lamella 1' is disposed on the upper side and the underside (in relation to FIG. 1) of the opposed lenticular surfaces. Each lamella 1' covers at least half of a curved lenticular surface of the sealing ring as best illustrated in FIG. 2. A plurality of alternating metal lamellae 2 and graphite lamellae 1 terminate in the remaining encircling outer edge region 5. The outer edge region 5 occupies approximately 10–50% of the remaining surface of the lenticular sealing ring and is defined by a plurality of encircling narrow sealing surfaces 6 which are separated from one another by metal lamellae 2 which terminate at the edge region. Thus, each graphite lamella cover 1' extends over approximately 50–90% of the curved surface.

The lenticular shape of the sealing ring is obtained by the layering of the graphite lamellae 1 and the metal lamellae 2 being differentially compressed as a function of the distance from the inside of the sealing ring toward the radially peripheral outside. The density of the graphite lamellae 1, 1' increases as function of the radial distance from the inside toward the outside. In a preferred embodiment, the density increases from approximately 0.9–1.4 g/cm$^3$ to approximately 1.8–2.3 g/cm$^3$.

Adhesives or impregnations may be used in the manufacture of the sealing ring. A non-stick coating may also be provided in order that the sealing ring does not remain stuck in the mould. The latter auxiliary agents may be removed or at least partially by a post formation treatment. In order to be used as an adjustable packing seal for sealing stationary and moving components (surfaces), specific post treatment operations can be undertaken. For example, the residual moisture can be removed for some sealing ring embodiments.

The curvature of the curved surfaces of the sealing ring may be configured to have different radii of curvature. The thickness is selected in accordance with the sealing application. The through-passage opening 4 may be cylindrical and smooth throughout as is illustrated. However, the opening may also have one or more offset portions or have a conical or quasi-conical configuration or be of a shape adapted for a specific component or application.

Figure 3:
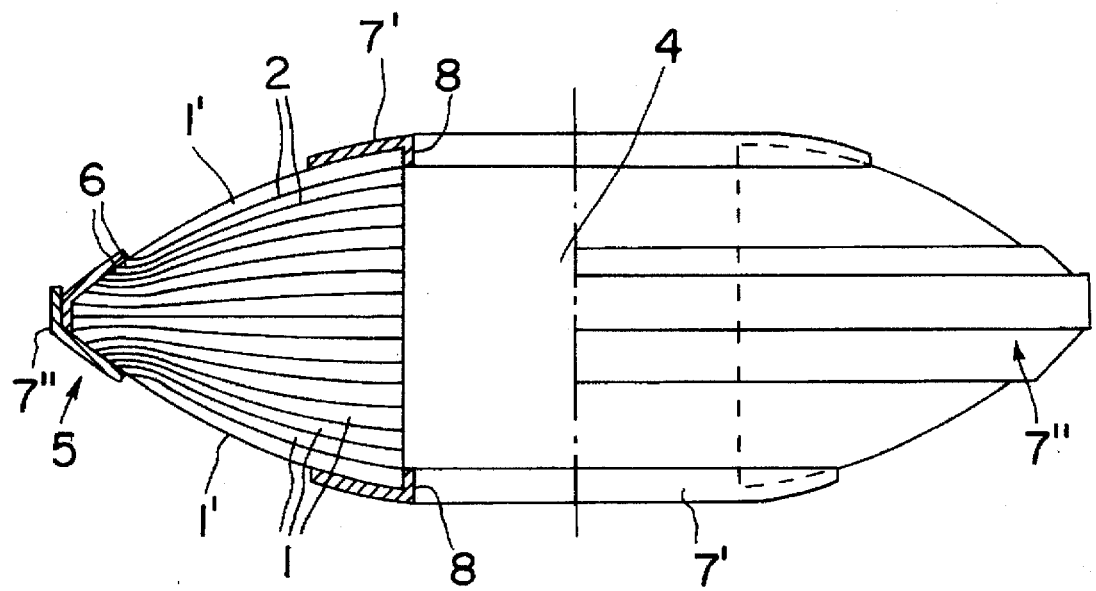
FIG. 3 is a side elevational view, partly in phantom and partly in section, illustrating an alternate embodiment of a sealing ring in accordance with the present invention.

With reference to FIG. 3, the sealing ring may also include inner and outer retainer rings 7', 7". The retainer rings 7', 7" may be made of different materials, for example, of a metal such as stainless steel, sintered metal, pressed material or plastic. The rings may have a thickness, for example, of from 0.05 to 3 mm. For some applications, the rings serve to prevent the graphite particles from detaching or washing out of the sealing ring.

With reference to FIG. 3, a curved, interacting retainer ring 7', which has a tightly fitting, inwardly directed collar 8, extends over a relatively narrow region of the upper and lower curved surfaces of the sealing ring. If the retainer ring 7' is made of correspondingly deformable material, it may be planar, i.e., in the non-installed state it may run parallel to the central plane of the sealing ring and need not initially conform in shape to the elliptical shape of the sealing ring. Upon installation, the clamping-in operation causes the ring 7' to engage against the sealing ring lamellae 1'. In addition or instead of the inner retainer ring 7', the sealing ring may also have an outer retainer ring 7" which peripherally encloses and binds together the outer portions of the sealing ring. The outer retainer ring 7" may extend over the outer edge of the continuous graphite lamella 1' and may be in one piece or else, as represented in FIG. 3, in two pieces. In the two-piece configuration, it is possible for the retainer ring 7" to be provided with interengaging edges or an outer flange.

Figure 1:
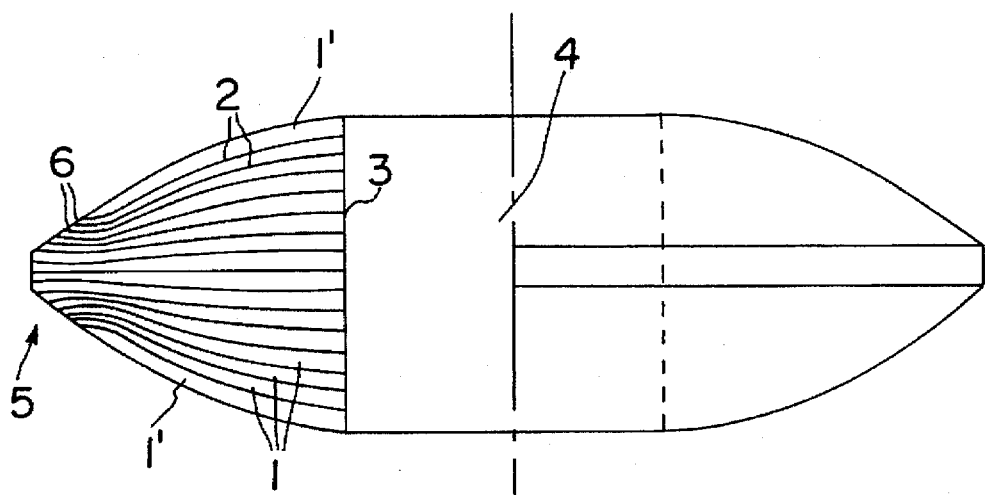
FIG. 1 is a side view, partly in section, of a sealing ring in accordance with the invention.
Figure 4:
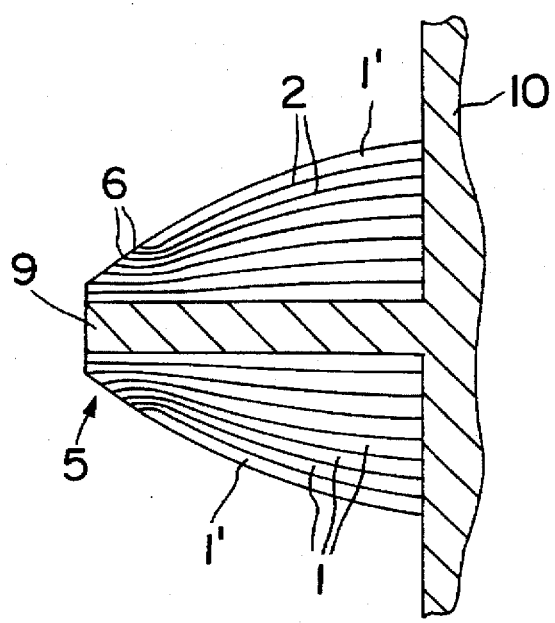
FIG. 4 is a fragmentary sectional view of an additional embodiment of a sealing ring in accordance with the present invention.

With reference to FIG. 4, the sealing ring may also have a two-part construction in that it comprises two ring halves or sections separated by a central radial planar member. In this configuration, the sealing ring is arranged on opposed sides of a disc-shaped section 9 of a component 10 which is generally exemplary of numerous possible mounting base components. Whether the sealing ring assumes a one-piece configuration such as represented in FIGS. 1 and 3 or a two piece configuration such as represented in FIG. 4, the sealing ring may be connected or mounted to a base component.

While a preferred embodiment of the foregoing invention has been set forth for purposes of illustration, the foregoing description should not be deemed a limitation of the invention herein.

What is claimed is:

1. A sealing ring having a lenticular shape defining an inner central axial opening and a pair of axially opposed curved surfaces extending outwardly from said opening and comprising a plurality of first lamellae made of expanded graphite and a plurality of second lamellae made of metal, said first and second lamellae being arranged in alternating relationship, said first lamellae having a density which increases from inner to outer portions thereof, and a graphite lamella cover defining at least half of each curved surface, wherein a plurality of metal and graphite lamellae terminate in an outer edge region which encircles the lamella cover.

2. The sealing ring of claim 1 wherein each graphite lamella cover extends over approximately 50–90% of the curved surface.

3. The sealing ring of claim 1 wherein the density of the graphite lamellae varies from the inside portion toward the outside from approximately 0.9–1.4 g/cm$^3$ to approximately 1.8–2.3 g/cm$^3$.

4. The sealing ring of claim 1 further comprising a retainer ring engaging one of said curved surfaces and disposed adjacent to the opening.

5. The sealing ring of claim 1 further comprising a retainer ring which encloses outer portions of the first and second lamellae.

6. The sealing ring of claim 1 further comprising a central radial planar segment traversing through the sealing ring so as to form two separate ring sections.

7. The sealing ring of claim 2 wherein the density of the graphite lamellae varies from the inside portion toward the outside from approximately 0.9–1.4 g/cm$^3$ to approximately 1.8–2.3 g/cm$^3$.

8. The sealing ring of claim 2 further comprising a retainer ring engaging one of said curved surfaces and disposed adjacent to the opening.

9. The sealing ring of claim 3 further comprising a retainer ring engaging one of said curved surfaces and disposed adjacent to the opening.

10. The sealing ring of claim 2 further comprising a retainer ring which encloses outer portions of the first and second lamellae.

11. The sealing ring of claim 3 further comprising a retainer ring which encloses outer portions of the first and second lamellae.

12. The sealing ring of claim 4 further comprising a retainer ring which encloses outer portions of the first and second lamellae.

13. The sealing ring of claim 2 further comprising a central radial planar segment traversing through the sealing ring so as to form two separate ring sections.

14. The sealing ring of claim 3 further comprising a central radial planar segment traversing through the sealing ring so as to form two separate ring sections.

15. The sealing ring of claim 4 further comprising a central radial planar segment traversing through the sealing ring so as to form two separate ring sections.

* * * * *

UNITED STATES PATENT AND TRADEMARK OFFICE
CERTIFICATE OF CORRECTION

PATENT NO. : 5,671,929
DATED : September 30, 1997
INVENTOR(S) : Herwig Pflug

It is certified that error appears in the above-indentified patent and that said Letters Patent is hereby corrected as shown below:

Title page at [73], cancel "Sweden" and substitute --Switzerland--.

Signed and Sealed this

Third Day of March, 1998

*Attest:*

*Attesting Officer*

BRUCE LEHMAN

*Commissioner of Patents and Trademarks*